(12) United States Patent
Dzieciol et al.

(10) Patent No.: US 11,331,760 B2
(45) Date of Patent: May 17, 2022

(54) ALIGNMENT TOOL AND METHOD FOR ALIGNING HEAVY MACHINERY AND EQUIPMENT

(71) Applicant: General Electric Company, Schenectady, NY (US)

(72) Inventors: Piotr Krzysztof Dzieciol, Warsaw (PL); Adrian Adam Klejc, Warsaw (PL); Sean Cornelius O'Meara, Halfmoon, NY (US); Szymon Perkowski, Warsaw (PL)

(73) Assignee: General Electric Company, Schenectady, NY (US)

( * ) Notice: Subject to any disclaimer, the term of this patent is extended or adjusted under 35 U.S.C. 154(b) by 350 days.

(21) Appl. No.: 16/246,783

(22) Filed: Jan. 14, 2019

(65) Prior Publication Data

US 2020/0189049 A1  Jun. 18, 2020

(51) Int. Cl.

| | |
|---|---|
| *F01D 25/28* | (2006.01) |
| *B23Q 1/00* | (2006.01) |
| *B66F 7/28* | (2006.01) |
| *B66F 7/16* | (2006.01) |

(52) U.S. Cl.
CPC .............. *B23Q 1/0054* (2013.01); *B66F 7/16* (2013.01); *B66F 7/28* (2013.01); *F01D 25/28* (2013.01)

(58) Field of Classification Search
CPC . F01D 25/28; F05D 2230/64; F05D 2230/644
See application file for complete search history.

(56) References Cited

U.S. PATENT DOCUMENTS

| | | | |
|---|---|---|---|
| 3,849,857 A | 11/1974 | Murray | |
| 4,698,575 A * | 10/1987 | Bouwer | .................... B23Q 1/36 318/135 |
| 6,871,412 B2 | 3/2005 | Markeson | |
| 8,517,363 B2 * | 8/2013 | Makino | ................. H01L 21/682 269/73 |

FOREIGN PATENT DOCUMENTS

| | | | |
|---|---|---|---|
| EP | 3211187 A1 | | 8/2017 |
| FR | 2846313 A1 | * | 10/2002 |
| FR | 2846313 A1 | | 4/2004 |
| WO | 2000056638 A1 | | 9/2000 |
| WO | WO0056638 | * | 9/2000 |
| WO | WO0056638 A | * | 9/2000 |

OTHER PUBLICATIONS

European Search Repod issued in connection with corresponding EP application No. 18461517.7 dated Sep. 4, 2018.

* cited by examiner

*Primary Examiner* — Mahdi H Nejad
(74) *Attorney, Agent, or Firm* — James Pemrick; Hoffman Warnick LLC

(57) ABSTRACT

Embodiments of the disclosure provide a tool and method for alignment adjustment of machinery. The tool may include a bottom plate, a top plate oriented in parallel planes, a low friction intermediate element between bottom plate and top plate, and a hydraulic actuator or electro-mechanic actuator arranged between the bottom plate and the top plate and capable of moving the top plate relative to the bottom plate.

13 Claims, 12 Drawing Sheets

Fig. 4
Detail B

Fig. 5
Detail C

ALIGNMENT TOOL AND METHOD FOR ALIGNING HEAVY MACHINERY AND EQUIPMENT

BACKGROUND OF THE INVENTION

The claimed invention relates to the field of alignment and adjusting the alignment of machinery such as gas turbines, steam turbines, generators, production machines and other large and heavy machines. This machinery stands on several mounting feet and has to be aligned precisely before running the machinery.

The invention also relates to a system comprising a control unit and several tools that are connected to each other such that the tools can be controlled by the control unit.

From U.S. Pat. No. 6,871,412 B2 (Markeson) an alignment tool and a method for aligning large machinery is known.

The alignment tool described in U.S. Pat. No. 6,871,412 B2 comprises a bottom plate and a top plate. Between the bottom plate and the top plate a low friction intermediate element is arranged allowing a limited relative movement between the bottom plate and the top plate. This relative movement is used for aligning the machinery.

This tool comprises jacking screws securing the top plate during setup and relative to the bottom plate. Once the machinery has been lifted such that its weight is diverted from the mounting feet to the supporting tools on each corner of the machinery, the jacking screws are released allowing a controlled and substantially uniplanar or horizontal movement of the machinery to allow the desired precise and efficient alignment of the machinery.

Even though this prior art contributes a progress in the art of aligning and adjusting large machinery it has to be stated that making use of these tools is still time-consuming and the quality of the alignment still depends quite a lot on the qualification of the persons that use these tools.

It is the aspect of the claimed invention to provide tools, a system and a method for adjusting the alignment of machinery that is easy to handle and achieves very good results. Further, the time for adjusting the alignment of machinery has to be reduced significantly.

SUMMARY OF THE INVENTION

This aspect is achieved by a tool according to claim 1. This tool comprises a bottom plate, a top plate, a low friction intermediate element between the bottom plate and the top plate and further comprises at least one hydraulic actuator or electro-mechanic actuator arranged between the bottom plate and the top plate capable of moving the top plate relative to the bottom plate.

Making use of hydraulic or electro-mechanic actuators that move the top plate relative to the bottom plate allows an exact control of the movement of the top plate and saves quite a lot of time for aligning the machinery. Further, it raises the quality of the adjustment, since the relative movement of each top plate relative to the base plate is predictable and can be controlled by a feed forward or a closed-loop control.

Due to the fact that no person has to operate the actuators manually, but the actuators are controlled by a control unit remote from the machinery, the danger of injuries is significantly reduced. Further the operator of the control unit has a better overview of the whole situation compared to a person that directly fastens or releases the jacking screws as known from the prior art.

To limit the movement of the top plate relative to the bottom plate, the bottom plate comprises a projecting part bearing the low friction intermediate element and the top plate comprises a recess surrounding the low friction intermediate element and the projecting part. Between the surrounding element and the projecting part an annular gap exists that limits the movement of the top plate relative to the base plate.

Since the low-friction intermediate element is surrounded by the walls of the recess and rests on top of the projecting part of the bottom plate, dust, dirt and/or humidity are kept away from the low-friction intermediate element raising the service-time of the machinery.

It has proven advantageous that the top plate comprises at least one lever arm, wherein a movable end of the at least one actuator is attached to the at least one lever arm and wherein a fixed end of the at least one actuator is attached to the bottom plate.

In a further advantageous embodiment the tool comprises a first pair of lever arms and a first pair of actuators, wherein the lever arms of the first pair of lever arms are located on opposite sides of the surrounding part of the top plate and wherein the actuators of the first pair of actuators are arranged on opposite sides of the surrounding part of the top plate and parallel to each other.

Doing so, it is possible to induce the forces from the actuators into the top plate in a very linear mode without applying torque or bending forces to the machinery and a very precise movement of the top plate in a direction parallel to the longitudinal axis of the actuators is achieved. This results in a very precise adjustment and alignment of the machinery.

In a still further improved embodiment of the claimed tool two pairs of lever arms and two pairs of actuators are provided. More particularly, the two pairs of lever arms enclose an angle of 90° and consequently the two pairs of actuators comprise an angle of 90°, too. This embodiment allows the exact alignment of machinery in a lateral and in an axial direction independent from each other.

To allow an alignment and lifting of the machinery lifting means are arranged between the bottom plate and the top plate of the tool or on top of the top plate, e.g. by means of a hydraulic jack.

This combination of the claimed tools and lifting means allows alignment of machinery in vertical, lateral and axial direction independent from each other.

More particularly, the actuators (hydraulic or electro-mechanic) are double-acting such that each actuator can push and pull the lever arm and move the top plate in two directions (forward and rearward).

To allow a closed-loop control of the movement of the top plate relative to the bottom plate means for detecting the position of the top plate relative to the bottom plate in one direction, in two directions or in three directions are provided. It is preferred if these directions are orthogonal to each other.

These means for detecting have an output such that a control unit can receive the output signals of the means for detecting the relative position and use it for a closed loop-control of the movement of the top plate.

The a. m. aspect is also achieved by a system for alignment adjustment of large machinery comprising at least two tools according to anyone of the preceding claims and a control unit, the tools being connected to the control unit such that each actuator of the tools is controlled by the control unit.

This control unit in a preferred embodiment comprises at least one outlet for each alignment movement to be controlled, a power supply, valves or switches for each output controlled by a processor of the control unit. Further, the control unit may have inputs for receiving signals from means for detecting the positions of the top plates relative to the bottom plates of several tools. This enables the control unit to execute a closed-loop control.

The aspect is further achieved by a method for adjusting the alignment of machinery making use of a system according to claims 9 to 12 by elevating the machinery on at least three lifting points distal from each other with the lifting means (i. e. hydraulic jacks or the like) and moving the top plates of each of the tools in axial and/or lateral direction and/or vertical direction of the machinery by driving the actuators of the tools such that the machinery is aligned precisely and within the set limits. The actuators of the tools may be actuated simultaneously or sequentially.

In a further advantageous embodiment of the claimed method the misalignment of each lifting point is determined before lifting the machinery and compiled into appropriate driving commands of the control unit, once the machinery has been lifted.

BRIEF DESCRIPTION OF THE DRAWINGS

The drawings show.

DETAILED DESCRIPTION

Figure 1:
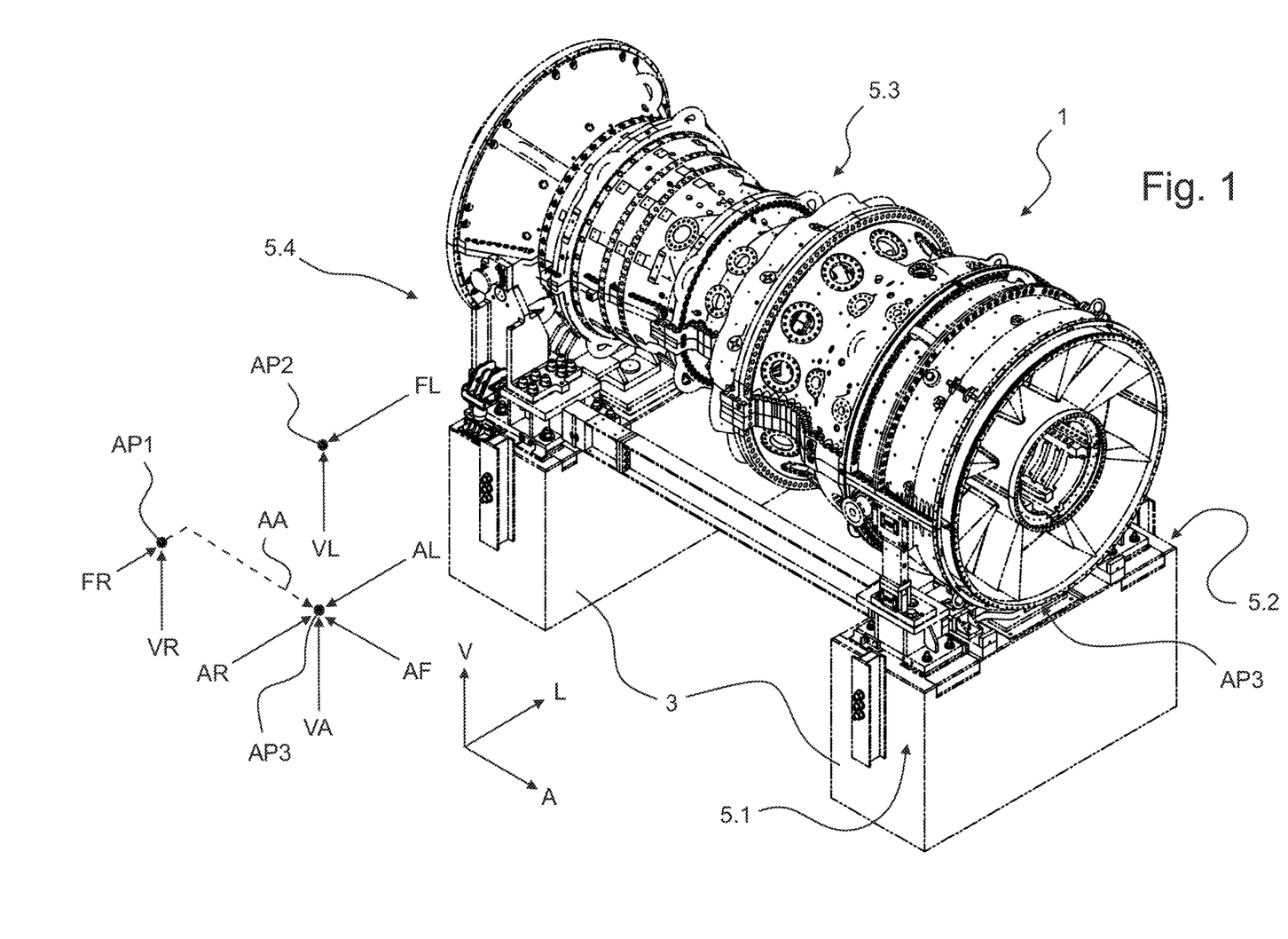
FIG. 1: A perspective view of a gas turbine.

FIG. 1 illustrates a gas turbine 1 in a perspective view as an example for large machinery that has to be aligned properly before being operated. The use of the claimed tools and method is not limited to the alignment of gas turbine, but can be applied to align any type of large machinery.

The gas turbine 1 is mounted on two socles 3. On these socles 3 four mounting points 5.1, 5.2, 5.3 and 5.4 are provided. Before being mounted on the mounting points 5.1 to 5.4 the gas turbine 1 has to be precisely aligned. Precisely aligned means that at each of the mounting points 5.1 to 5.3 of the gas turbine 1 has an appropriate position in an axial direction A, a lateral direction L and a vertical direction V. Connecting the gas turbine 1 with the socles 3 at the mounting points 5.1 to 5.4 must not change this alignment. Aligning the gas turbine 1 has to be executed not only when installing the gas turbine 1 for the first time, but in regular time intervals when the gas turbine 1 is overhauled.

The invention claims tools, a system and a method for adjusting the alignment of a gas turbine 1 or any other machinery in a more efficient and more precise manner than known from the art.

For aligning gas turbine 1 relative to the mounting points 5.1 to 5.4 it is obvious, that the jaws and bolts connecting the gas turbine 1 with the mounting points 5.1 to 5.4 have to be released. Further means for aligning the gas turbine 1 in the directions of the axes A, L and V are required. To achieve an optimal alignment with regard to precision and costs, the claimed method uses tools for alignment of large machinery at three alignment points AP1, AP2 and AP3.

These three alignment points AP1, AP2 and AP3 are shown schematically in the left part of FIG. 1 without the gas turbine. The fact that the claimed method requires only three alignment points AP instead of four alignment points as known from the prior art U.S. Pat. No. 6,871,412 B2 is a first important advantage with regard to precision and costs of the alignment.

In FIG. 1 the alignment movements that are necessary for aligning a gas turbine are illustrated by arrows VR and FR at the alignment point 1, VL and FL at the alignment point 2 and the arrows VA, AK, AA, AL and AF at the alignment point AP3. A similar scheme can be found in FIG. 12 that shows the hydraulic part of the control unit of the claimed invention. In conjunction with the claimed invention the alignment movements in opposing direction are considered as two alignment movements. For example AL and AR, AA and AF are considered as four alignment movements. FR and FL are considered as two further alignment movements To properly align the gas turbine 1 or the other machinery it is obvious that at each alignment point AP1 to AP3 lifting the gas turbine 1 in a vertical direction is required. Consequently, at each alignment point 1 one alignment movement VR (c.f. AP1), VL (c.f. AP2) and VA (c.f. AP3 is provided. By means of these three alignment movements VR, VL and VA it is possible to properly align the gas turbine 1 in a vertical direction and to lift the gas turbine 1 from the socles 3 to allow alignment in a horizontal plane.

To properly align the gas turbine in a lateral direction (parallel to the axis L) four alignment movements FR, FL, AR and AL are required.

At the alignment point AP1 the alignment movement FR is executed. The same applies to the alignment point AP2 and alignment movement FL. The alignment directions FR and FL have opposite directions. This means that it is sufficient if the tools for aligning a gas turbine 1 at the alignment points AP1 and AP2 provide one alignment movement. These tools do not require a double-acting actuator or two opposed actuators acting in opposed directions (for example FR and FL).

In other words: The tools for aligning the gas turbine 1 required in the alignment points AP1 and AP2 are capable only of pushing the gas turbine 1 in the direction of one of the arrows FR and FL. Independent from that it is possible to lift the gas turbine (c.f. the arrows VR and VL) at the alignment points AP1 and AP3 independently from each other.

To complete the alignment of the gas turbine 1 in a horizontal plane there are four movements required at the alignment point AP3. For a lateral alignment the alignment movements AR and AL (c.f. the arrows AR and AL) are required.

For an axial alignment of the gas turbine 1 there are two additional alignment movements required (c.f. the arrows AA and AF).

In other words, for perfectly aligning the gas turbine 1 or any other large machinery at the alignment point AP1 the alignment movements VR and FR, at the alignment point AP2 the alignment movements VL and FL and at the alignment point AP3 five alignment movements VA, AR, AL, AA and AF are required.

For this reason the claimed tool for aligning the gas turbine at the alignment points AP1 and AP2 is simpler and requires less space than the claimed tool required for aligning the gas turbine 1 at the alignment point AP3.

The alignment of the gas turbine in a vertical direction is executed by means of jacks, by hydraulic jacks, that are known from the art and which are not described in detail.

Figure 2:
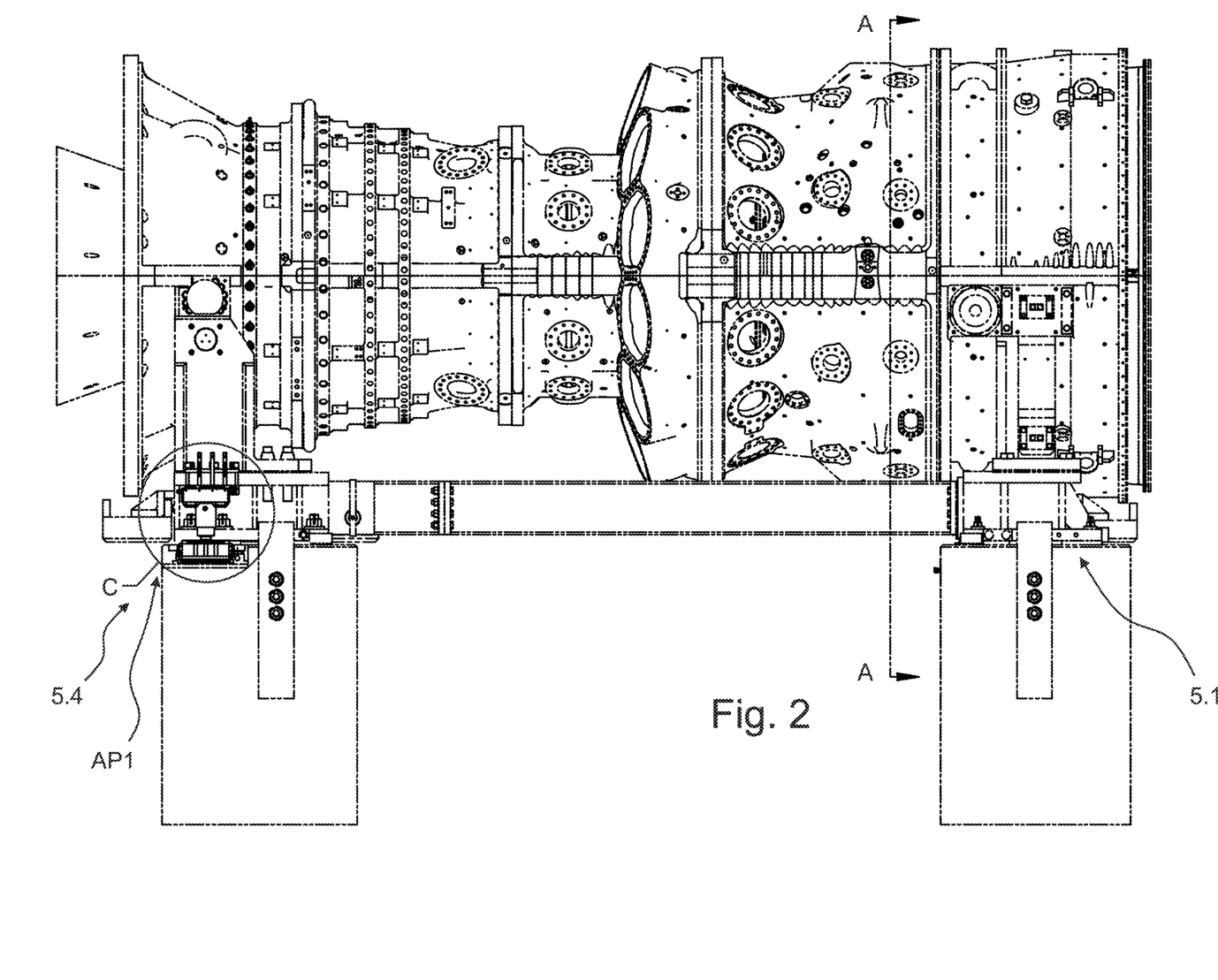
FIG. 2: A side view of the gas turbine of FIG. 1.

In FIG. 2 a side view of the gas turbine 1 of FIG. 1 is illustrated. On the left side of the FIG. 2 the alignment point AP1 and the mounting points 5.1 and 5.4 can be seen.

In FIG. 2 a side view of the gas turbine 1 of FIG. 1 is illustrated. On the left side of FIG. 2 the alignment point AP1 and the mounting point 5.4 can be seen. On the right side of FIG. 2 the mounting point 5.1 can be seen. The alignment points AP2 and AP3 are not visible in FIG. 2.

From FIG. 2 it can be seen that the mounting point 5.4 and the alignment point AP1 are nearby or adjacent to each other. The same applies to the mounting point 5.3 and the alignment point AP2 (not visible in FIG. 2). The alignment point AP3 is right in the middle between the mounting points 5.1 and 5.2 as can be seen in FIG. 3.

Figure 3:
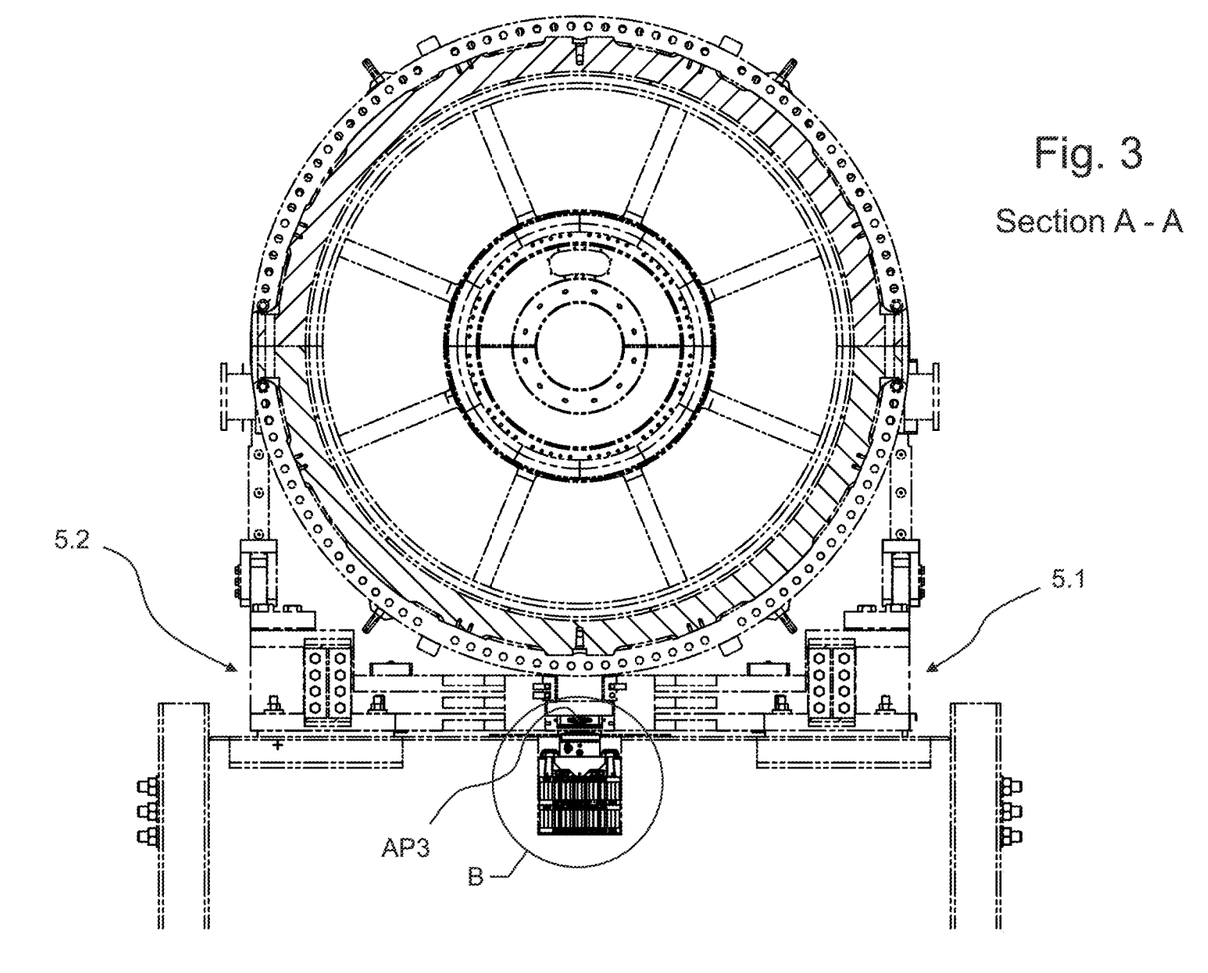
FIG. 3: A front view of one end of the gas turbine.

FIG. 3 illustrates a cross-sectional view of the gas turbine 1 along the line A-A from FIG. 2. In this figure the alignment point AP3 and the mounting points 5.1 and 5.2 can be seen.

Figure 4:
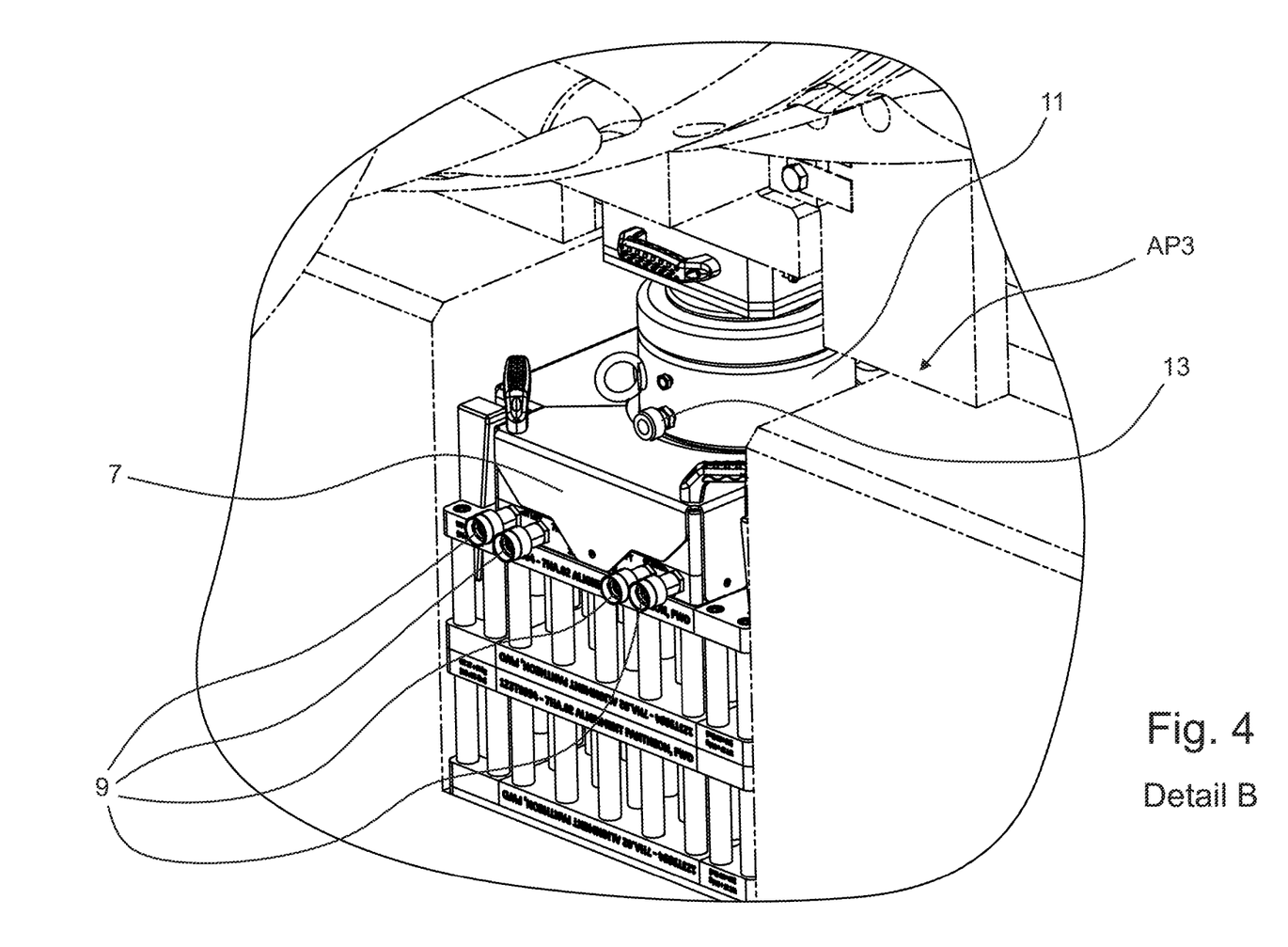
FIG. 4: A detail from FIG. 3.

FIG. 4 illustrates the detail B from FIG. 3 in a perspective view. In FIG. 4 a second embodiment of the claimed tool can be seen. This embodiment of the tool for aligning large machinery has the reference numeral 7. The tool 7 is capable of executing four alignment movements AR, AA, AL and AF in a horizontal plane as explained in conjunction with FIG. 1. There are four hydraulic inlets 9 illustrated.

On top of tool 7 a hydraulic jack 11 is arranged having further inlet 13 to provide an alignment movement VA.

Figure 5:
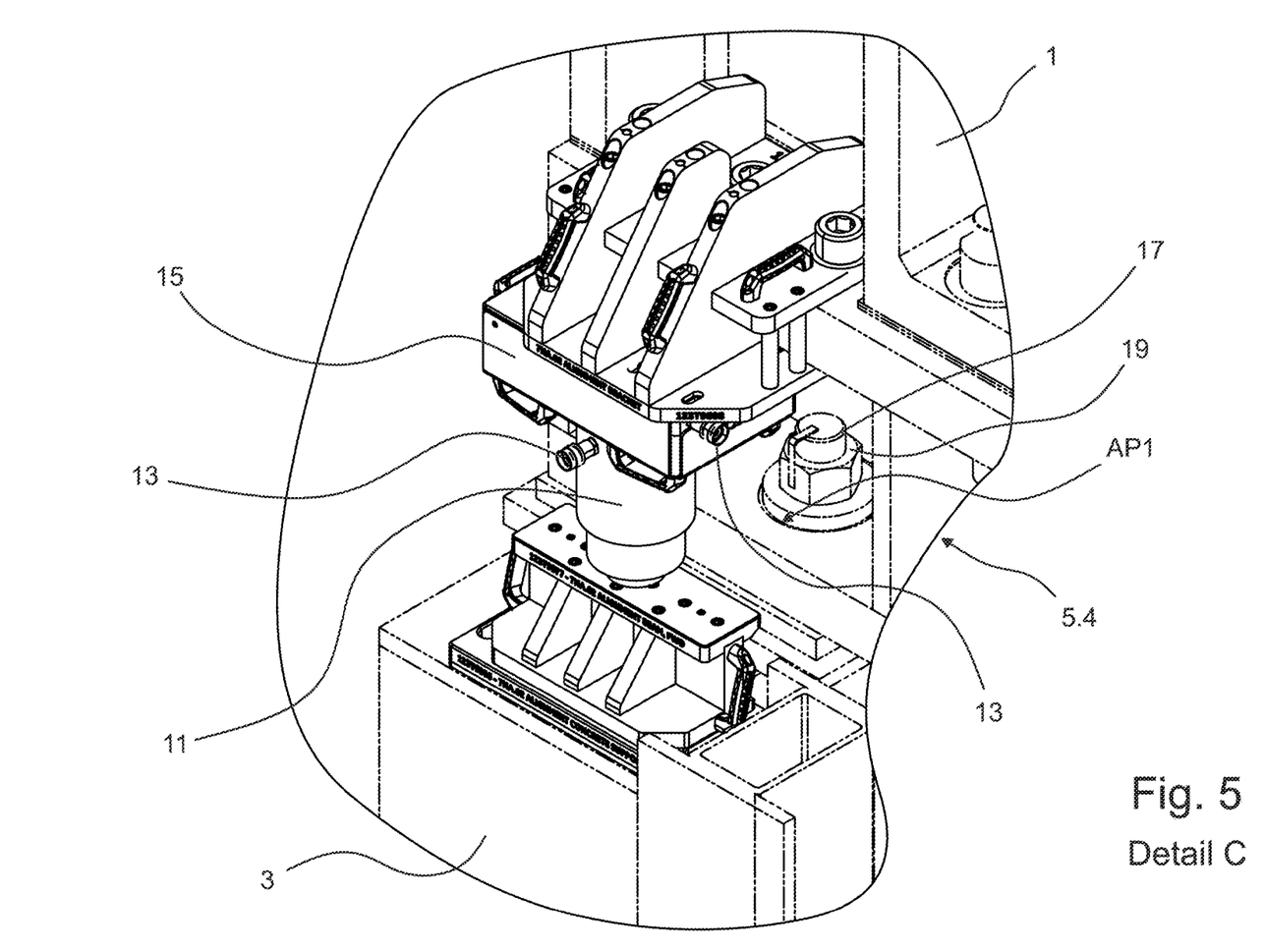
FIG. 5: A detail from FIG. 2.

FIG. 5 illustrates the detail C (c.f. FIG. 1) of the first alignment point AP1. The tool for aligning has the reference numeral 15 and is, compared to FIG. 4, mounted upside down. Between the socle 3 and the tool 15 a hydraulic jack 11 is arranged. Of course, it does not make any difference, whether the hydraulic jack 11 is mounted on top of any of the tools 7 or 15 or arranged below these tools.

In FIG. 5 it can be seen that between the socles 3 and the lower part of the gas turbine 1 several mounting bolts 17 and nuts 19 are provided. In case the gas turbine 1 shall be aligned, the nut 19 has to be opened to allow a movement in axial, lateral and vertical direction of the gas turbine 1 relative to the socle 3 at the mounting point. The tool 15 provides only one alignment movement and therefore only one hydraulic inlet 13 is provided.

Figure 6:
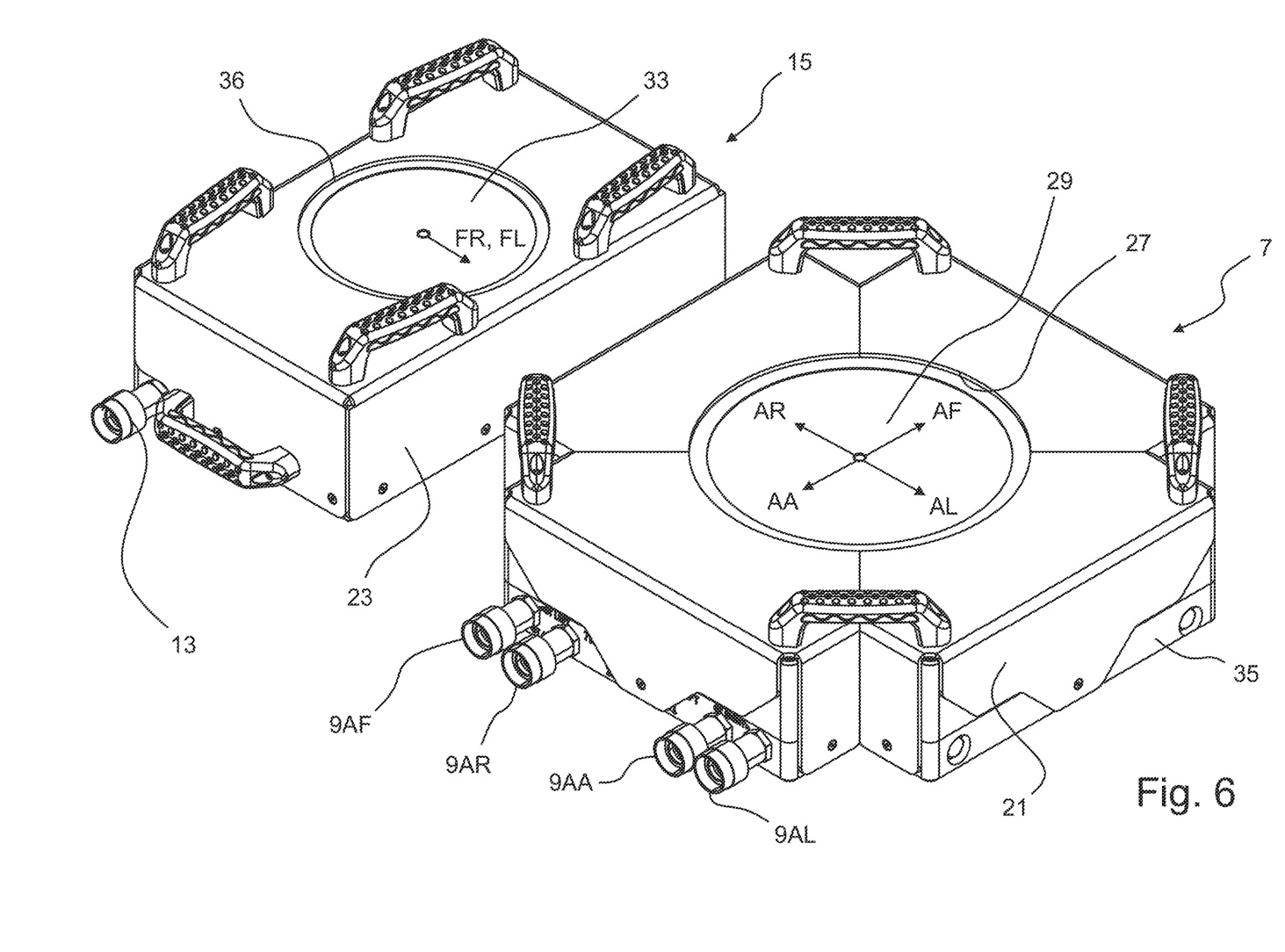
FIG. 6: A perspective view of two embodiments of the claimed tool.

In FIG. 6 the tools 7 and 15 are illustrated in a perspective view. The tools 7, 15 are protected by a casing 21, 23 made from sheet metal.

Figure 12:
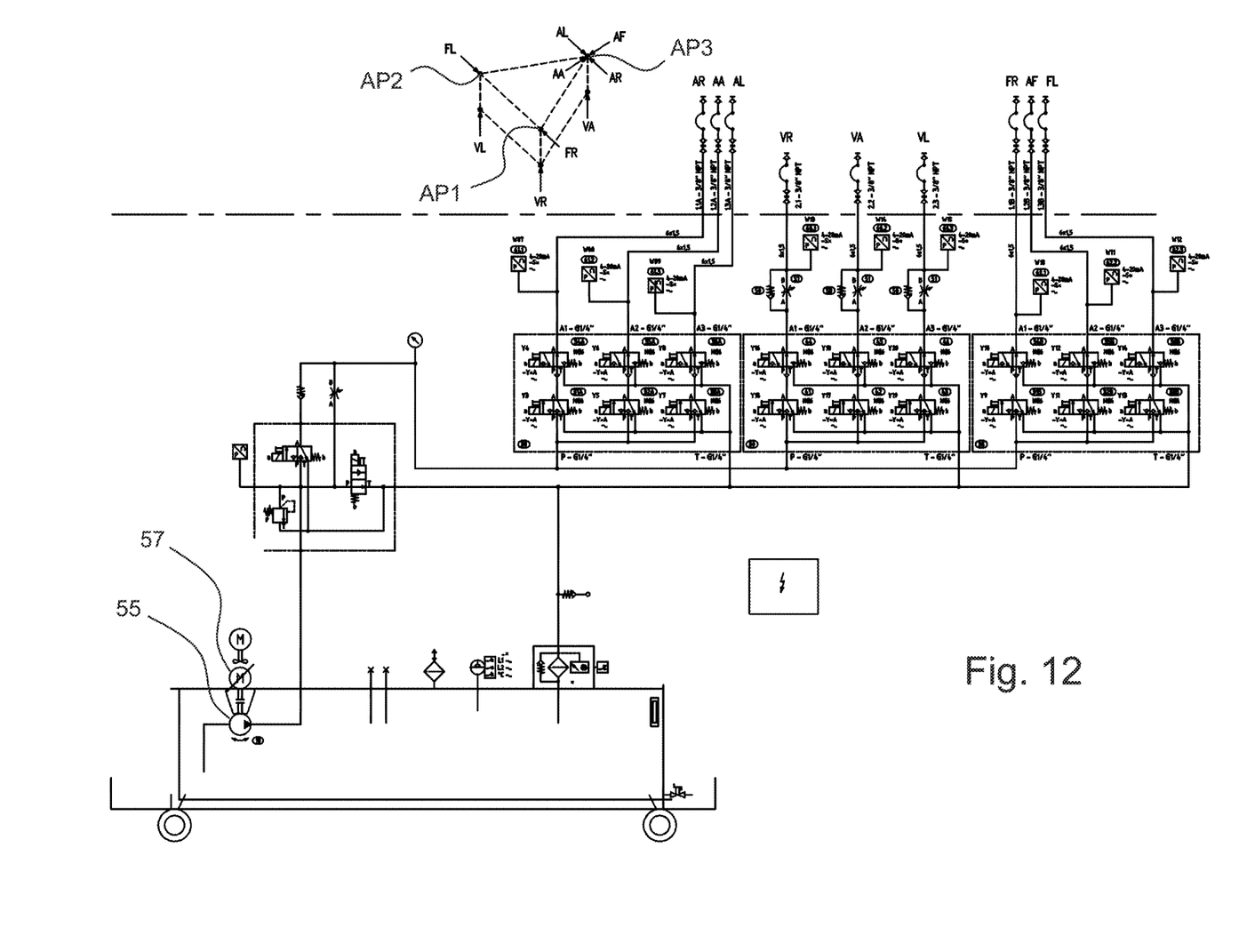
FIG. 12: The hydraulic system of the claimed invention.

The tool 7 comprises a base plate 35, a part of which is not covered by the casing 21. The hydraulic inlets 9FL, 9AR, 9AA and 9AL are mounted on the base plate. Each of these inlets 9 is connected with the respective outlets of a control unit, as illustrated in FIG. 12.

The casing 21 has an opening on its top. Inside this opening 27 a top plate 29 of the tool 7 can be seen.

By means of several hydraulic actuators inside the casing 21 it is possible to move the top plate 29 relative to the base plate 35 in the directions AR, AF, AL and AA. These movements allow the alignment of the third alignment point AP3 as described in conjunction with FIG. 1.

The tool 15 is based on the same technology as the tool 7, but with a reduced functionality. The casing 23 of the tool 15 covers the base plate completely the latter being not visible in FIG. 6. The top plate 33 of the tool 15 can be seen, since the casing 23 of the tool 15 provides an opening 36 similar to the opening 27 of the casing 21. The top plate 33 can be moved along the direction illustrated by the arrow FL, FR in FIG. 6. Dependent, whether the tool 15 is mounted at the alignment point AP1 or the alignment point AP2, the tool 15 executes the alignment movements FR or FL. In other words: The tools 15 used at the alignment points AP1 and AP2 are identical, which helps to reduce the costs and increases the availability.

Figure 7:
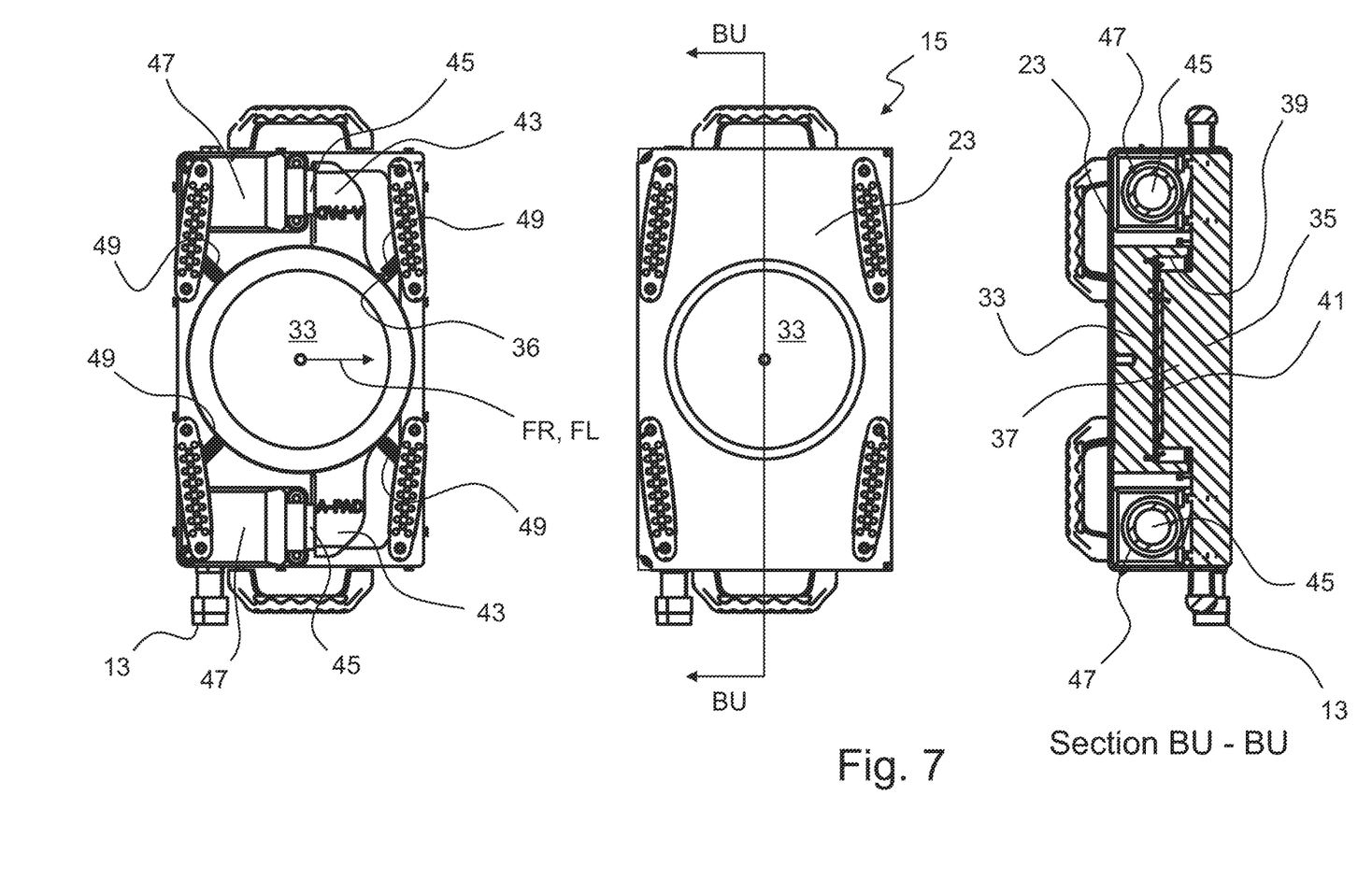
FIG. 7: Several views of the first embodiment of the claimed tool.

In FIG. 7 the tool 15 is shown in several views. In some of these views the casing 23 has been cut off to show the design details of the tool 15.

In the center of FIG. 7 a top view of the tool 15 is shown. At the right side of FIG. 7 a cross-sectional view along the line BU-BU can be seen. In this cross-sectional view the base plate 35 and the top plate 33 are visible.

In the middle of the base plate 35 a projecting part 37 is provided. It further can be seen that the top plate 33 comprises a recess 39. The inner diameter of the recess 39 is larger than the outer diameter of the projecting part 37, such that a relative movement of the top plate 33 relative to the base plate is possible within the limit set by the difference of the inner diameter of the recess 39 and the outer diameter of the projecting part 37.

Between the projecting part 37 and the top plate a low-friction intermediate element 41 is provided. The low-friction intermediate element 41 may comprise a plurality of captured ball bearings or comprise two layers of roller bearings at right angles and separated by a plate. This element can also comprise a plate of a low-friction material, such as PTFE (Teflon) or a layer of grease or oil between the recess and the projecting part of the base plate 33.

On the left side of FIG. 7 a top view of the tool 15 is shown, with most of the casing 23 cut away. From this view it can be seen that the top plate 33 comprises two lever arms 43, one on each side of the top plate 33. In this embodiment both lever arms share the same longitudinal axis (not illustrated). Each of the lever arms 43 is connected with a piston 45 of a hydraulic actuator 47. The tools 15 may be applied in the alignment points AP1 and AP2.

If hydraulic pressure is applied to the hydraulic actuators 47 the pistons 45 move the lever arms 43 and the top plate 3 relative to the base plate 35 executing the desired alignment movement FL, FR.

The actuators 47 are connected with a control unit (not shown in FIG. 6) and receive hydraulic fluid under pressure, if an alignment movement FR, FL is to be carried out. In the cross-sectional view along the line BU-BU the pistons 45 and the hydraulic actuators 47 can be seen, too.

To center the top plate 33 relative to the base plate 35 in case the hydraulic actuators 47 are not pressurized, four springs 49 are arranged radially between the top plate 33 and the base plate 35.

Figure 8:
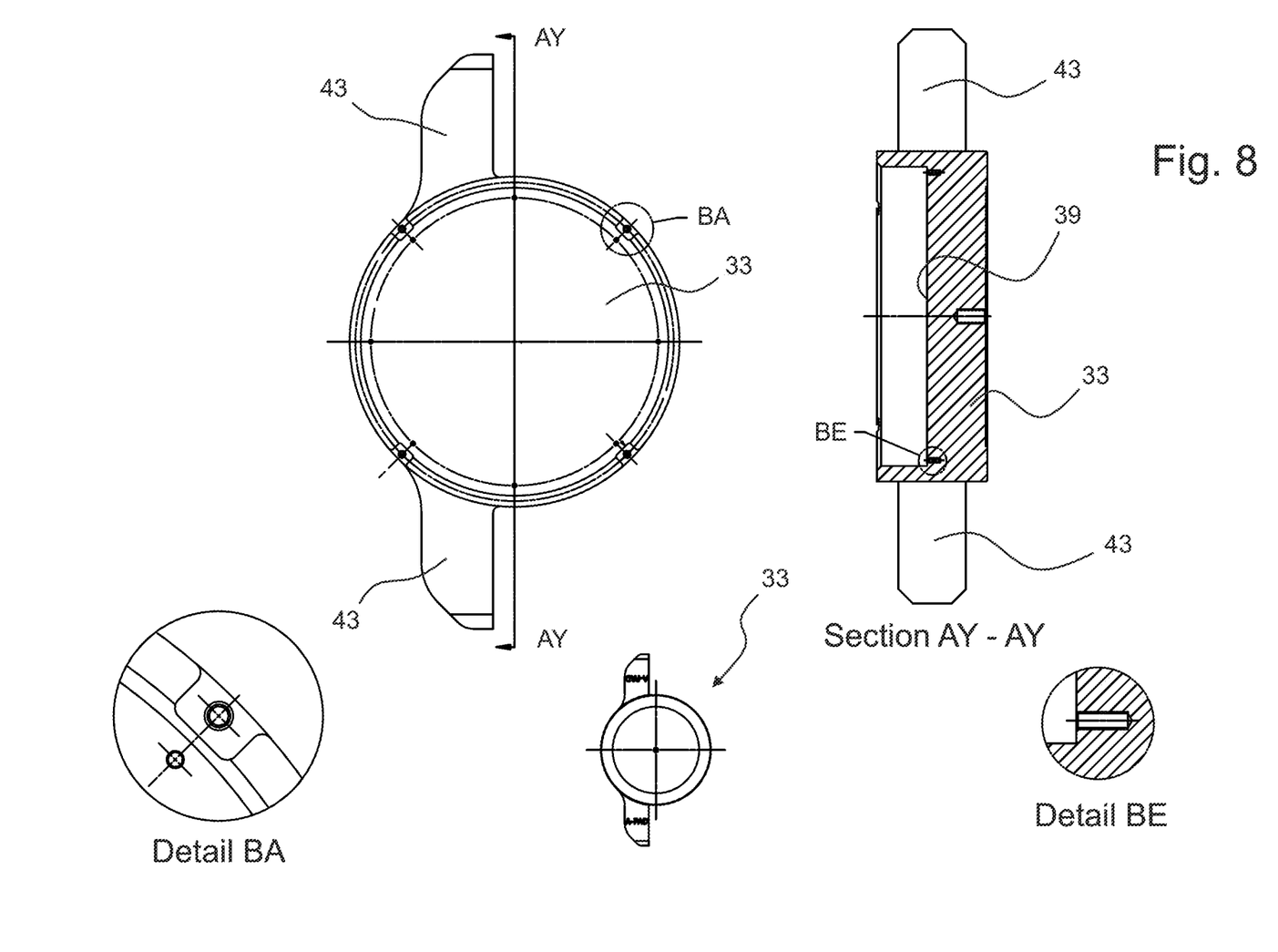
FIG. 8: Several views of a top plate of the first embodiment.

FIG. 8 illustrates the top plate 33 and its lever arms 43 and its recess 39 in more detail. In this exemplary embodiment the recess 39 is circular. Consequently, the projecting part 37 of the base plate is circular, too. It would also be possible that the recess 39 and the projecting part have a rectangular cross-section.

Figure 9:
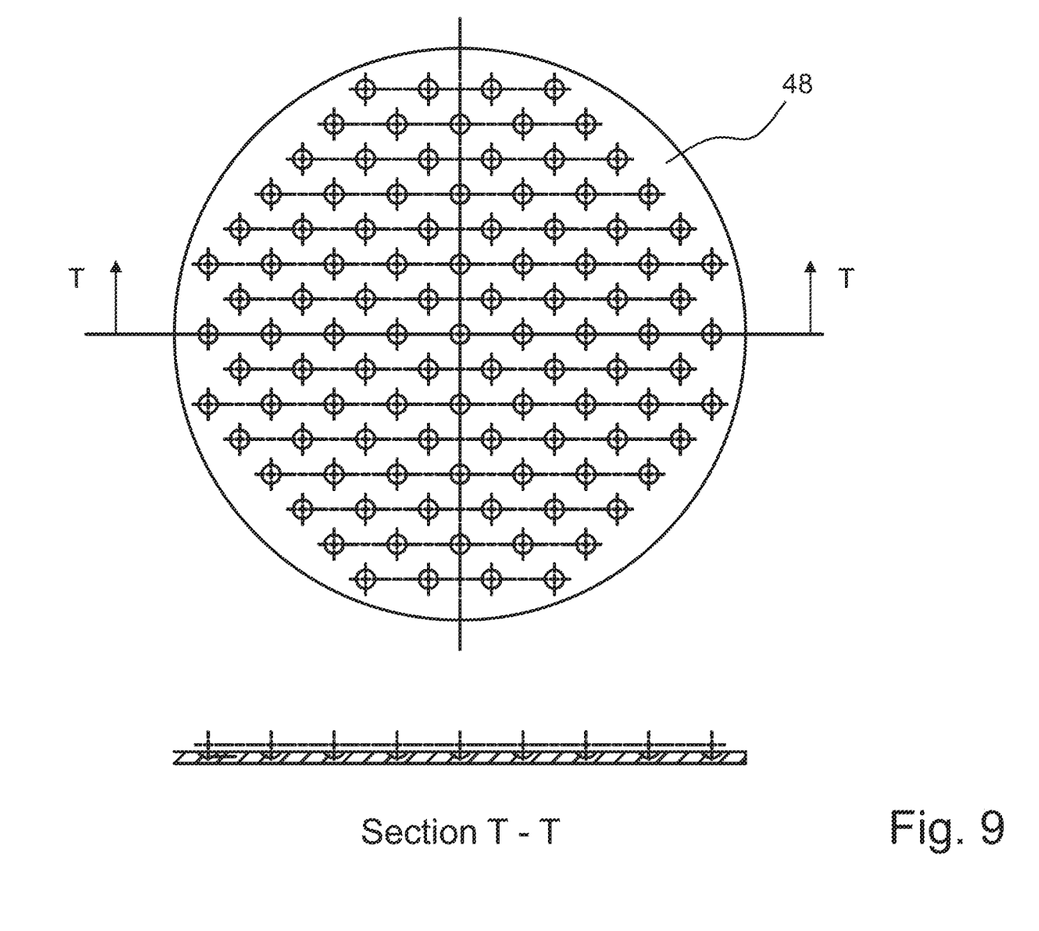
FIG. 9: Part of the low-friction intermediate element.

In FIG. 9 a part of the low-friction intermediate element 41 is illustrated. It comprises a plate 48 having the same diameter as the projecting part of the base plate 35. The plate 48 is part of a ball bearing and comprises multiple cavities for balls (not shown) that allow a low-friction relative movement between the top plate and the base plate.

Further details of such a ball bearing or as an alternative a low-friction intermediate element with two layers of roller bearings at right angles can be found in U.S. Pat. No. 6,871,412 B2. As mentioned before, in some cases it is sufficient to provide a plate of PTFE (Teflon) between the projecting part 37 and the recess 39 to sufficiently reduce friction between top plate 33 and base plate 35.

Figure 10:
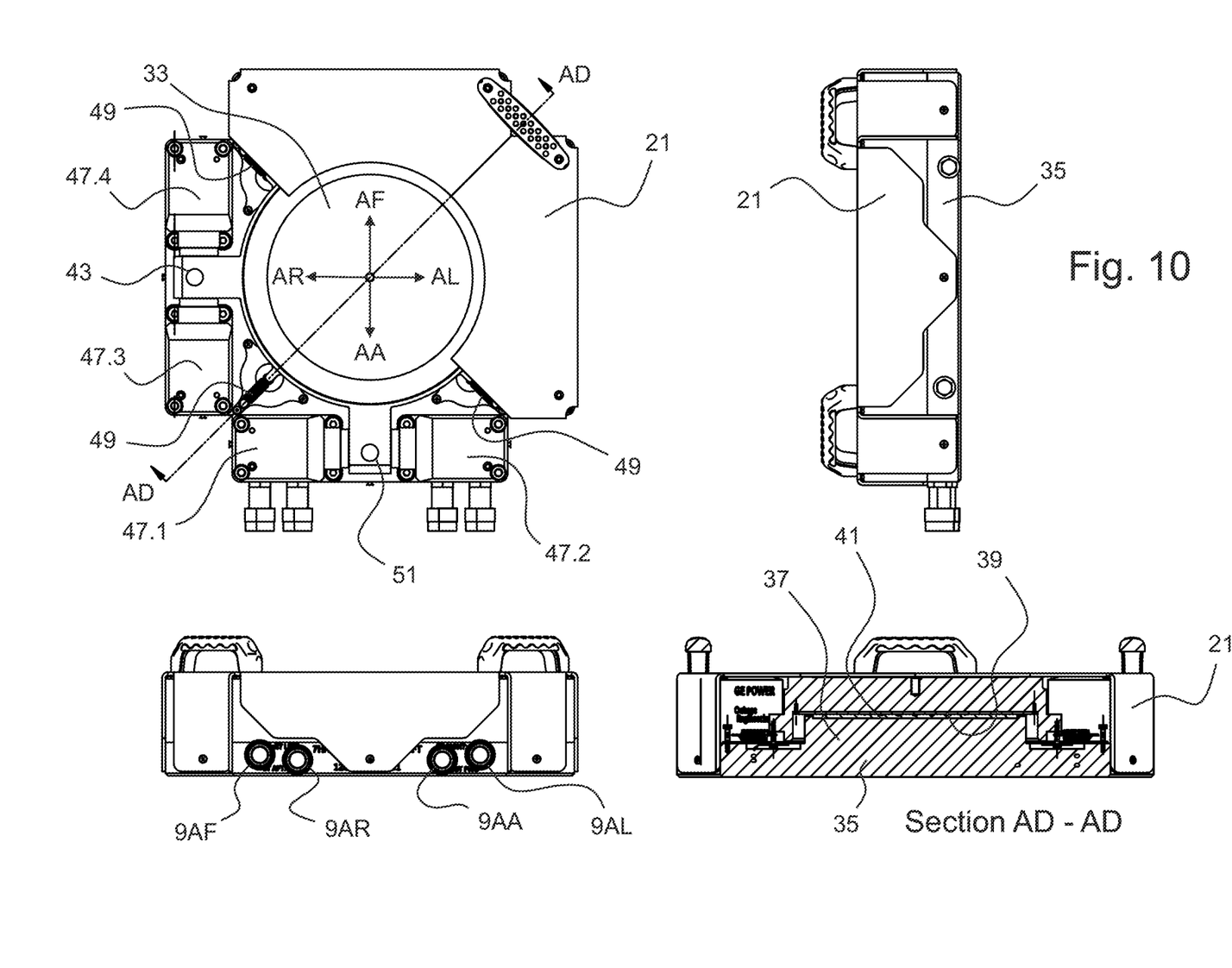
FIG. 10: Several views of the second embodiment of the tool.

FIG. 10 shows the tool 7 in several views. In principle, the design of the tool 7 is similar to the design of the tool 15, as far as the base plate, the projecting part, the top plate and the recess are concerned. For this reason the same parts have the same reference numerals as the tool 15. For reasons of clarity, not in all views of each reference number is drawn.

The main difference between the tools 7 and 15 is that the tool 7 provides four alignment movements, whereas the tool 15 only provides one alignment movement.

In the top view of FIG. 10 the different alignment movements are illustrated similar to FIG. 6. Since the top plate 33 of the tool 7 shall be moved into four directions AF, AL, AA and AR, there are two pairs of lever arms 43 and 51 provided on the top plate 33. The lever arms 43 and 51 enclose an angle of 90°.

At each lever arm 43, 51 two hydraulic actuators 47 are attached. In the top view of FIG. 10 one lever arm 43, one lever arm 51 and four actuators 47 are visible, since the casing 21 is cut away only in part. The other four hydraulic actuators are covered by the casing 21. From FIG. 11 details of the top plate 33 with four lever arms 43 and 51 can be seen.

In the side view and the top view of FIG. 10 the hydraulic inlets 9 can be seen. Each hydraulic inlet 9 is attached to two hydraulic actuators 47, which are parallel to each other and act in the same direction.

E.g., the actuator 47.1 is connected with the inlet 9AL, since the hydraulic actuator 47.1 moves the top plate 33 towards the direction of the alignment movement AL. The hydraulic actuator 47.2 is connected with the inlet 9AR. The same applies mutatis mutandis to the hydraulic actuators 47.3 and 47.4. By pressurizing e.g. the inlet 9AF and the inlet 9AL it is possible to move the top plate 33 simultaneously towards the alignment directions AF and AL. It also possible to pressurize the different hydraulic actuators 7 sequentially, such that the alignment movements towards one of the four directions AA, AR, AF and AL are executed one behind the other.

As has been mentioned before in FIG. 10, only half of the actuators 47 are visible. The respective co-actuators are not visible due to the casing 21.

Figure 11:
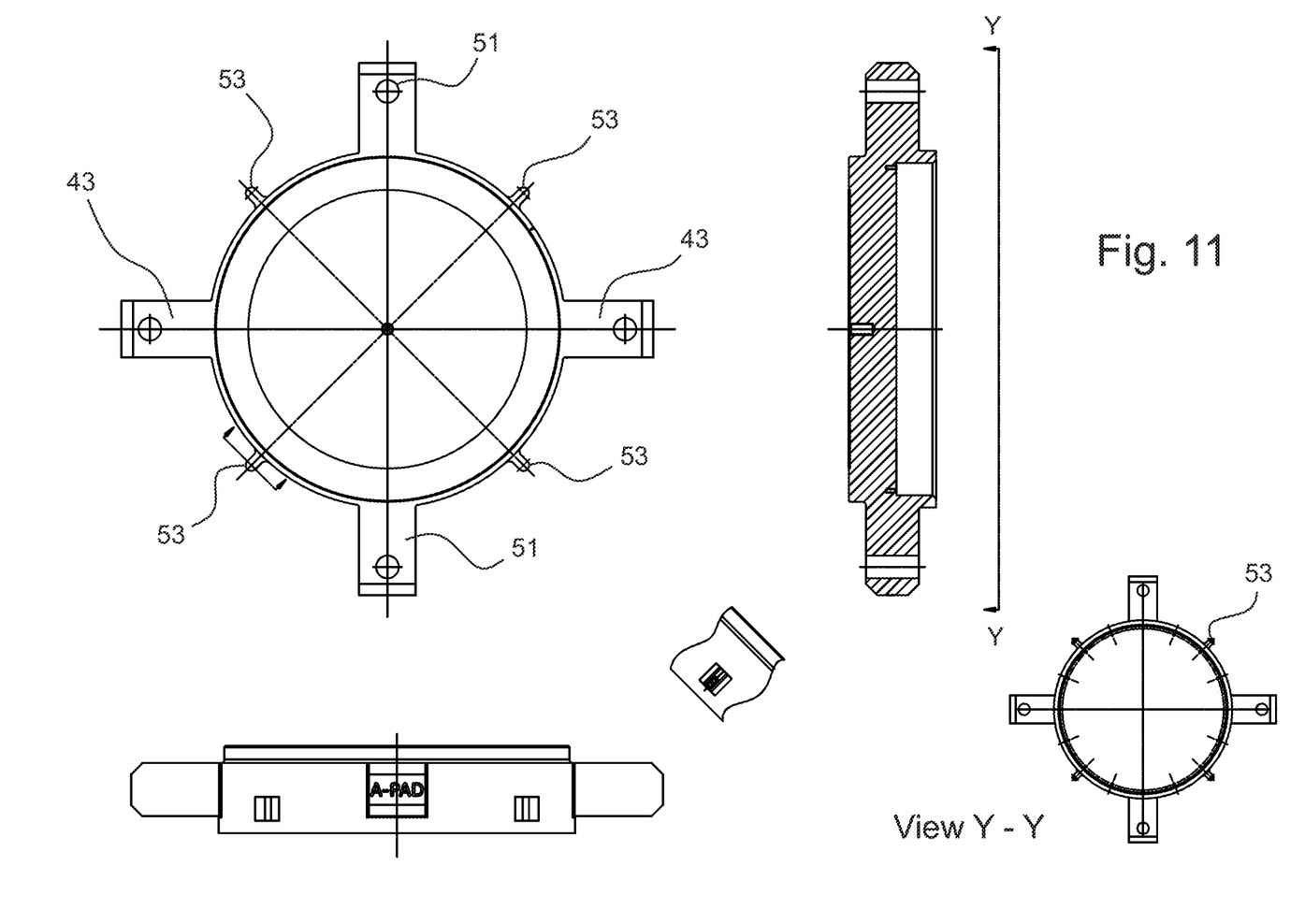
FIG. 11: Several views of the top plate of the second embodiment.

From FIG. 11 which shows the top plate 33 in more detail, it becomes clear that the top plate 33 has a symmetric contour and eight hydraulic actuators 47 can be attached to the four levers 43 and 51 of the top plate in this embodiment.

Similarly to the tool 15 four springs 49 are provided between the top plate 33 and the base plate 35 centering the top plate 33 relatively to the base plate 35, if none of the hydraulic actuators 47 is pressurized.

In FIG. 11 it can be seen that the four noses or protrusions 53 serve as anchoring points for the springs 49 (not shown in FIG. 11).

The hydraulic jacks 11 and the tools 7 and 15 are connected with a hydraulic control unit, a schematic flow-scheme of which is illustrated in FIG. 12.

The control unit comprises a pump 55 driven by an electric motor 57 and several hydraulic pipes and valves. Further, the control unit comprises multiple outlets AR, AA, AL, VR, VA, VL, FR, AF and FL. Each of these outlets is connected with one of the hydraulic inlets of the hydraulic jacks 11 or the tools 7 and 15, such that the alignment movements that are schematically shown in FIG. 12 and described in detail in FIG. 1 are executed if the respective outlet of the control unit is pressurized by means of the pump 55 and due to an appropriate command of the valves of the control unit.

The electric parts of the control unit such as a display, a user interface and the wiring for submitting commands to the pump and the valves are not shown.

The invention claimed is:

1. A tool for alignment adjustment of machinery comprising:
a bottom plate;
a top plate positioned parallel to the bottom plate, the top plate including:
a first pair of lever arms positioned on opposite sides of the top plate, and
a second pair of lever arms positioned on opposite sides of the top plate;
a low friction intermediate element between the bottom plate and the top plate;
and a plurality of actuators arranged between the bottom plate and the top plate and capable of moving the top plate relative to the bottom plate,
wherein at least two actuators of the plurality of actuators are mounted on opposite sides of each lever arm of the first and second pairs of lever arms,
wherein each of the plurality of actuators includes a fixed end attached to the bottom plate and a movable end attached to a lever arm of the first and second pairs of lever arms.

2. The tool according to claim 1, wherein the bottom plate comprises a projecting part bearing the low friction intermediate element and in that the top plate comprises a recess surrounding the low friction intermediate element and the projecting part.

3. The tool according to claim 1, wherein lifting means are provided below the bottom plate or on top of the top plate.

4. The tool according to claim 1, wherein the plurality of actuators are double-acting.

5. The tool according to claim 1, further comprising means for detecting a position of the top plate relative to the bottom plate in at least one direction.

6. A system for alignment adjustment of large machinery comprising:
at least two tools according to claim 1 and a control unit, each of the tools being connected to the control unit such that each actuator of the tools is driven by the control unit.

7. The system according to claim 6, wherein the control unit controls the plurality of actuators by a feed forward control or a closed loop control.

8. The system according to claim 6, wherein the control unit includes at least one outlet for each actuator of each tool, a power supply, valves or switches for each outlet controlled by a processor.

9. The system according to claim 6, wherein the system receives output signals from the means for detecting the position of the top plate relative to the bottom plate.

10. A method for adjusting the alignment of machinery using a system according to claim 6, the method comprising the steps of:
elevating the machinery on at least three alignment points distal from each other with the lifting means,
moving the top plates of each of the tools in at least one of an axial or lateral direction of the machinery by driving the plurality of actuators of the tools until the machinery is aligned within the set limits.

11. A method according to claim 10, wherein the plurality of actuators of the tools are driven simultaneously or sequentially.

12. A method according to claim 10, wherein before lifting the machinery the misalignment at each alignment point is determined and compiled into appropriate driving commands of the control unit.

13. The tool according to claim 1, wherein each lever arm of the first pair of lever arms and the second pair of lever arms encloses at an angle of 90 degrees.

* * * * *